(12) United States Patent
Jain et al.

(10) Patent No.: US 10,494,297 B2
(45) Date of Patent: *Dec. 3, 2019

(54) LIME SLAKER SYSTEM, MODULAR WATER PANEL FOR LIME SLAKER SYSTEM, AND METHOD OF USING THE SAME

(71) Applicant: Integrity Municipal Systems, LLC, Poway, CA (US)

(72) Inventors: Roop C. Jain, Poway, CA (US); Robert R. Arseneau, Holland, MI (US); Kyle A. Lindberg, Allendale, MI (US)

(73) Assignee: Integrity Municipal Systems, LLC, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,372

(22) Filed: Feb. 5, 2018

(65) Prior Publication Data

US 2018/0155241 A1 Jun. 7, 2018

Related U.S. Application Data

(63) Continuation of application No. 15/019,374, filed on Feb. 9, 2016, now Pat. No. 9,908,812.

(60) Provisional application No. 62/114,450, filed on Feb. 10, 2015.

(51) Int. Cl.
*C04B 2/04* (2006.01)
*C04B 2/08* (2006.01)

(52) U.S. Cl.
CPC . *C04B 2/04* (2013.01); *C04B 2/08* (2013.01)

(58) Field of Classification Search
CPC .......................... C04B 2/00–2/04; C04B 2/08
See application file for complete search history.

(56) References Cited

U.S. PATENT DOCUMENTS

| 6,990,393 B2 | 1/2006 | Parker |
| 9,908,812 B2 * | 3/2018 | Jain ........................... C04B 2/04 |
| 2012/0328510 A1 | 12/2012 | Christy et al. |

OTHER PUBLICATIONS

"Dry Chemical Feed Systems, Series A-758 Lime Slaking System", Integrity Municipal Systems, Jul. 1, 2013, 4 pages, Poway, CA.
"Dry Chemical Feed Systems, Series A-758 Plus Lime Slaking System", Integrity Municipal Systems, Jul. 1, 2013, 4 pages, Poway, CA.

* cited by examiner

*Primary Examiner* — Natasha E Young
(74) *Attorney, Agent, or Firm* — The Webb Law Firm (57) ABSTRACT

A lime slaker system for converting quicklime to a lime slurry includes: a lime feeder; a base slaker that includes a slaking chamber and a dilution chamber; a grit remover; and a modular water panel with a piping assembly in fluid communication with at least the base slaker and grit remover. The modular water panel is configured to independently control water distributed to the slaking compartment, the dilution chamber, and the grit remover.

20 Claims, 11 Drawing Sheets

LIME SLAKER SYSTEM, MODULAR WATER PANEL FOR LIME SLAKER SYSTEM, AND METHOD OF USING THE SAME

CROSS REFERENCE TO RELATED APPLICATIONS

This application is a continuation of U.S. patent application Ser. No. 15/019,374, now U.S. Pat. No. 9,908,812, filed Feb. 2, 2016, which claims the benefit of U.S. Provisional Application No. 62/114,450, filed Feb. 10, 2015, which is incorporated herein by reference in its entirety.

BACKGROUND OF THE INVENTION

Field of the Invention

The present invention relates to lime slaker systems, and in particular, to an improved lime slaker system, modular water panel for a lime slaker system, and method of using the same.

Description of the Related Art

Because of its low cost, abundance, and availability, lime is one of the most widely used chemicals in municipal and industrial water treatment processes. For instance, lime is often used for acid neutralization, lime softening, sludge conditioning, and air pollution control. Before lime is introduced into a water treatment process, such as any of the processes previously described, it is made into a wet suspension or slurry. The conversion of dry lime into a wet suspension or slurry requires a number of steps. For instance, lime in its natural form of calcium carbonate ($CaCO_3$) or limestone must first undergo a calcination process to form calcium oxide (CaO), which is also referred to as quicklime. The quicklime is then reacted with water and is used in a water treatment process as a water suspension or slurry of calcium hydroxide ($Ca(OH)_2$).

In small plant operations, bagged hydrated lime ($Ca(OH)_2$) is sometimes used with a feeder and mixing tank to prepare the slurry. However, the cost of commercial hydrated lime becomes prohibitive for installations requiring a continuous, high volume supply. The inconvenience of shipping and stocking makes it even less practical. To overcome these drawbacks, on-site lime slaking is often utilized. As such, it is desirable to provide new and improved on-site lime slaking systems for converting dry lime into a wet suspension or slurry.

SUMMARY OF THE INVENTION

Accordingly, and generally, provided is an improved lime slaker system, modular water panel for a lime slaker system, and method of using the same.

In one preferred and non-limiting embodiment or aspect, provided is a lime slaker system that includes: a lime feeder; a base slaker comprising a slaking chamber and a dilution chamber; a grit remover; and a modular water panel with a piping assembly in fluid communication with at least the base slaker and grit remover. The modular water panel is configured to independently control water distributed to the slaking compartment, the dilution chamber, and the grit remover. The lime slaker system can also include a dust arrestor and a dilution water dispenser positioned in the dilution chamber.

Further, the modular water panel of the lime slaker system can include components for controlling, monitoring, and supplying water to the slaking compartment, grit remover, dust arrestor, dilution water dispenser, and the like. For example, the modular water panel can include one or more of the following: a supply water on/off valve configured to control water entering the piping assembly, a supply water pressure gauge configured to monitor water pressure of the water entering the piping assembly, a slaking water on/off valve configured to control flow of water to the slaking compartment, a slaking water pressure regulator, a slaking water pressure gauge and switch, a grit remover water on/off valve configured to control flow of water to the grit remover, a grit remover flow control valve configured to regulate water pressure distributed to the grit remover, an electronic grit remover flowmeter configured to measure the flow of water to the grit remover, a dust arrestor water on/off valve configured to control flow of water to the dust arrestor, and a dilution water dispenser on/off valve configured to control flow of water to the dilution water dispenser. To remove debris from the water that is supplied to the lime slaker system, a water strainer can be positioned in at least a portion of the piping assembly.

The modular water panel can also include a bypass water manual valve and a bypass water solenoid valve configured to bypass a unit mounted water control valve connected to the slaking compartment. In addition, the modular water panel can include a hose wash-down valve, as well as an auto-batching solenoid valve configured to control flow of water to at least one of the grit remover and dilution water dispenser during a shut-down sequence.

In one preferred and non-limiting embodiment or aspect, provided is a method of slaking lime that includes: feeding quicklime into a slaking compartment with a lime feeder; distributing water into the slaking chamber; mixing the quicklime and water in the slaking compartment to form a lime paste; and diluting the lime paste with water in a dilution chamber to form a lime slurry. The water distributed into the slaking compartment and dilution chamber is supplied and controlled by a modular water control panel comprising a piping assembly in fluid communication with the slaking compartment and dilution chamber.

The method of slaking lime can also include collecting dust and vapor in a dust arrestor, condensing the dust and vapor with water, and removing grit from the lime slurry with water and a grit removing device. The water for condensing the dust/vapor and for removing the grit can be supplied and controlled by the modular water panel. Moreover, when a start-up sequence, a shut-down sequence, and/or a power failure occurs, the method can include supplying water to the slaking compartment that bypasses a unit mounted water slaking valve. The bypass water can also be supplied and controlled by the modular water panel. Further, the water and lime can be distributed into the slaking compartment to form a lime paste with a 2:1 water-to-lime concentration, while the lime slurry can be diluted to form a lime slurry with a 4:1 water-to-lime concentration.

In one preferred and non-limiting embodiment or aspect, provided is a modular water panel as previously described that is in fluid communication with a lime slaker device configured to convert quicklime into a lime slurry. The lime slaker device can include the same lime slaker device previously described or a different lime slaker device.

Further preferred and non-limiting embodiments or aspects are set forth in the following numbered clauses:

Clause 1: A lime slaker system, comprising: a lime feeder; a base slaker comprising a slaking compartment and a dilution chamber; a grit remover; and a modular water panel comprising a piping assembly in fluid communication with at least the base slaker and grit remover, wherein the modular water panel is configured to independently control water distributed to the slaking compartment, the dilution chamber, and the grit remover.

Clause 2: The lime slaker system of clause 1, further comprising a dust arrestor positioned in the dilution chamber.

Clause 3: The lime slaker system of clause 1 or 2, wherein the modular water panel further comprises a dust arrestor water on/off valve configured to control flow of water to the dust arrestor.

Clause 4: The lime slaker system of any of clauses 1-3, wherein the modular water panel further comprises a supply water on/off valve configured to control water entering the piping assembly, and a supply water pressure gauge configured to monitor water pressure of the water entering the piping assembly.

Clause 5: The lime slaker system of any of clauses 1-4, wherein the modular water panel further comprises a slaking water on/off valve configured to control flow of water to the slaking compartment, a slaking water pressure regulator, and a slaking water pressure gauge and switch.

Clause 6: The lime slaker system of any of clauses 1-5, wherein the modular water panel further comprises a grit remover water on/off valve configured to control flow of water to the grit remover, a grit remover flow control valve configured to regulate water pressure distributed to the grit remover, and an electronic grit remover flowmeter configured to measure the flow of water to the grit remover.

Clause 7: The lime slaker system of any of clauses 1-6, wherein the modular water panel further comprises a bypass water manual valve and a bypass water solenoid valve configured to bypass a unit mounted water control valve connected to the slaking compartment.

Clause 8: The lime slaker system of any of clauses 1-7, further comprising a dilution water dispenser positioned in the dilution chamber.

Clause 9: The lime slaker system of any of clauses 1-8, wherein the modular water panel further comprises a dilution water dispenser on/off valve configured to control flow of water to the dilution water dispenser.

Clause 10: The lime slaker system of any of clauses 1-9, wherein the modular water panel further comprises an auto-batching solenoid valve configured to control flow of water to at least one of the grit remover and the dilution dispenser during a shut-down sequence.

Clause 11: The lime slaker system of any of clauses 1-10, wherein the modular water panel further comprises a hose wash-down valve.

Clause 12: The lime slaker system of any of clauses 1-11, wherein the modular water panel further comprises a water strainer positioned in at least a portion of the piping assembly.

Clause 13: A modular water control panel in fluid communication with a lime slaker device configured to convert quicklime into a lime slurry, the modular water control panel comprising a piping assembly and controls configured to control flow of water to the lime slaker device.

Clause 14: The modular water control panel of clause 13, further comprising a supply water on/off valve, a water strainer positioned in at least a portion of the piping assembly, and a supply water pressure gauge.

Clause 15: The modular water control panel of clause 13 or 14, further comprising a slaking water on/off valve, a slaking water pressure regulator, and a slaking water pressure gauge and switch.

Clause 16: The modular water control panel of any of clauses 13-15, further comprising a grit remover water on/off valve, a grit remover flow control valve, and an electronic grit remover flowmeter.

Clause 17: The modular water control panel of any of clauses 13-16, further comprising a bypass water manual valve and a bypass water solenoid valve.

Clause 18: The modular water control panel of any of clauses 13-17, further comprising a dust arrestor water on/off valve.

Clause 19: The modular water control panel of any of clauses 13-18, further comprising a dilution water dispenser on/off valve, a hose wash-down valve, and an auto-batching solenoid valve.

Clause 20: A method of slaking lime, comprising: feeding quicklime into a slaking compartment with a lime feeder; distributing water into the slaking compartment; mixing the quicklime and water in the slaking compartment to form a lime paste; and diluting the lime paste with water in a dilution chamber to form a lime slurry, wherein the water distributed to the slaking compartment and dilution chamber is supplied and controlled by a modular water control panel comprising a piping assembly in fluid communication with the slaking compartment and dilution chamber.

Clause 21: The method of clause 20, further comprising collecting dust and vapor in a dust arrestor, and condensing the dust and vapor with water, wherein the water for condensing the dust and vapor is supplied and controlled by the modular water control panel.

Clause 22: The method of clause 20 or 21, further comprising removing grit from the lime slurry with water and a grit removing device, wherein the water for removing grit is supplied and controlled by the modular water control panel.

Clause 23: The method of any of clauses 20-22, further comprising supplying water to the slaking compartment that bypasses a unit mounted water slaking valve during at least one of a start-up sequence, a shut-down sequence, and a power failure, wherein the bypass water is supplied and controlled by the modular water control panel.

Clause 24: The method of any of clauses 20-23, wherein the water and lime are distributed into the slaking compartment to form the lime paste with a 2:1 water-to-lime concentration.

Clause 25: The method of any of clauses 20-24, wherein the lime slurry is diluted in the dilution chamber to form the lime slurry with a 4:1 water-to-lime concentration.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, and in one preferred and non-limiting embodiment or aspect, the present invention is directed to a lime slaker system 10 and a modular water panel 50 that is in fluid communication with a lime slaker system 10. As used herein, a "lime slaker system" refers to a system that converts calcium oxide (CaO) into a water suspension or slurry of calcium hydroxide ($Ca(OH)_2$). Calcium oxide (CaO), as referred to herein, is used interchangeably with the term "quicklime." Further, as used herein, the term "modular water panel" refers to a panel with various components that are configured to control and deliver water to any of the devices that form the lime slaking system.

Figure 1:
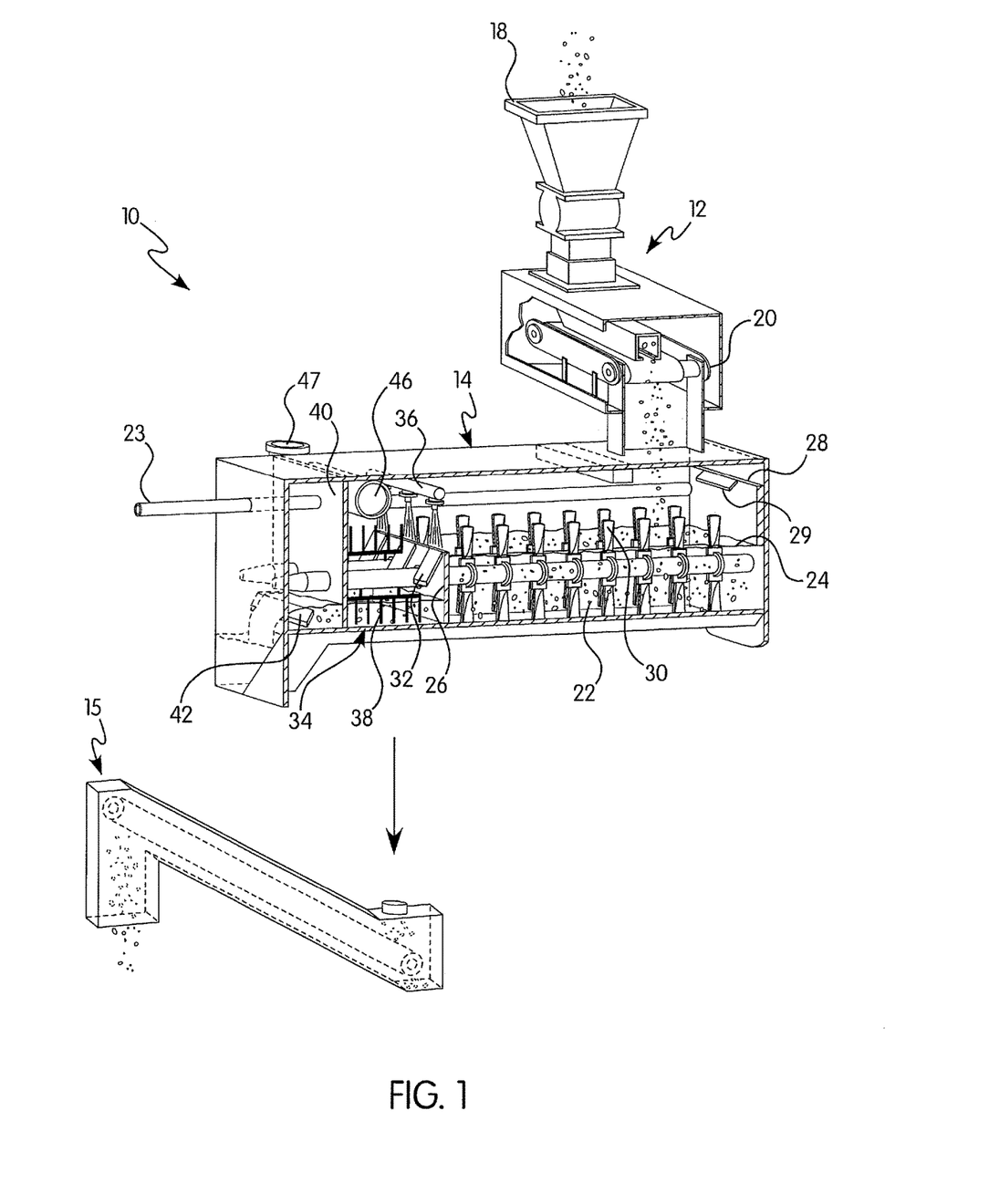
FIG. 1 is a perspective cross-sectional view of a lime feeder, base slaker, and grit remover of a lime slaker system according to one aspect of the present invention.

Referring to FIG. 1, and in one preferred and non-limiting embodiment or aspect, the lime slaker system 10 of the present invention includes a lime feeder 12 that is configured to receive quicklime at an inlet portion 18 and meter the lime to an outlet portion 20 where it is discharged into a base slaker 14. The lime feeder 12 can be used to control the feed rate of quicklime into the base slaker 14. Controlling the lime feed rate through the lime feeder 12 also helps control the output of lime slurry from the base slaker 14. Non-limiting examples of lime feeders 12 that can be used with the lime slaker system 10 include gravimetric weight belt-feeders, volumetric screw-type feeders, and volumetric belt-type feeders.

As shown in FIG. 1, the lime feeder 12 can be positioned directly above the base slaker 14. This provides a more compact arrangement between the lime feeder 12 and the base slaker 14, thereby reducing the footprint size of the entire lime slaker system 10. When the lime feeder 12 is positioned above the base slaker 14, quicklime can be discharged into a base slaker 14 through a chute. As would be appreciated by those skilled in the art, the lime feeder 12 can be positioned in various other locations relative to the base slaker 14. For instance, the lime feeder 12 can also be positioned next to the base slaker 14, such that the lime feeder 12 and base slaker 14 are parallel to each other.

With continued reference to FIG. 1, the base slaker 14 can include a slaking compartment 22 having a first end 24 that receives lime from the lime feeder 12 and a second end 26 that discharges the slaked lime. The first end 24 of the slaking compartment 22 can have a water inlet 28 with an optional weir 29, where water enters during the slaking process. The slaking compartment 22 of the base slaker 14 also includes a mixing device 30 that mixes the water and lime into a paste-type composition. The mixing device 30 can include, but is not limited to, rotating paddles, such as two intermeshing sets of paddles that are configured to rotate in counter directions. The mixing device 30 can be driven by a gear reduction unit.

Further, to control the amount of water entering the slaking compartment 22, the base slaker 14 can include a unit mounted slaking water valve 23. Non-limiting examples of unit mounted slaking water valves 23 include mechanically-actuated torque valves, electronic valves, and pneumatic valves. When a mechanically-actuated torque valve is used as the unit mounted slaking water valve 23, water is added when an increase in torque is required to mix the lime and water. When the torque is decreased, the flow of water into the slaking compartment 22 is reduced as lime is added. The desired viscosity of the paste-type lime composition can be varied by adjusting the compression on a spring located between the gear reduction unit and the mechanically actuated torque valve. This process automatically maintains the desired water-to-lime ratio. Alternatively, when an electronic or pneumatic valve is used, the water-to-lime ratio is controlled by monitoring the mixing device 30 current. The unit mounted slaking water valve 23 can be used in conjunction with the lime feeder 12 to achieve a desired water-to-lime ratio. For example, the feed rate at which water and lime enter the slaking compartment 22 can be controlled to obtain a water-to-lime ratio ranging from 2:1 to 4:1 such as, but not limited to, a 2:1, 3:1, or 4:1 water-to-lime ratio mixture.

By controlling the water-to-lime ratio, a number of benefits can be achieved as compared to lime slakers that can only utilize the traditional 4:1 water-to-lime ratio. In some examples, the amount of lime and water delivered into the base slaker 14 is controlled to obtain a low 2:1 water-to-lime ratio during at least a portion of the lime slaking process, or throughout the entire slaking process in order to form a paste that provides numerous benefits. For instance, a 2:1 water-to-lime slaking ratio has been found to generate its own slaking heat from the hydration reaction of quicklime and water. This can be used to avoid the expense of an external heat source, internal heat exchangers, and temperature control systems. The ability to use a 2:1 water-to-lime slaking ratio also provides additional advantages including: a faster slaking process due to the low water content and heat generation; a smaller slaking compartment 22; a smaller horsepower requirement; and a more reactive lime slurry solution due to the intense heat generated by the hydration reaction, which increases the internal pressure in the slaking compartment 22 to fracture the quicklime into smaller, more highly reactive particles.

As indicated, water and quicklime can be mixed in the slaking compartment 22 to form a paste-type composition. Subsequently, after forming the paste-type lime composition, the composition can be discharged at the second end 26 of the slaking compartment 22 into a dilution chamber 34. As shown in FIG. 1, the dilution chamber 34 can be positioned substantially adjacent to the second end 26 of the slaking compartment 22, such that the paste-type lime composition discharged from the slaking compartment 22 directly enters the dilution chamber 34.

A weir 32 can also be positioned at the second end 26 of the slaking compartment 22 where the paste-type lime composition is discharged. When a weir 32 is present, the paste-type lime composition will flow over the weir 32 and into the dilution chamber 34. A dilution water dispenser 36, such as a spray bar with nozzles, is positioned in the dilution chamber 34 where the paste-type lime composition is discharged from the slaking compartment 22. The water sprayed from the dilution water dispenser 36 breaks up and dilutes the paste-type lime composition to form a lime slurry that contains a higher concentration of water/lower concentration of solids as compared to the paste-type composition. The dilution water dispenser 36 can dilute the paste-type lime composition to a specific lime slurry concentration. For example, the dilution water dispenser 36 can dilute a 2:1 water-to-lime paste-type lime composition to a 4:1 water-to-lime slurry. Thus, as used herein, a lime slurry has a water-to-lime concentration of 4:1 or greater and a lime paste has a water-to-lime concentration of less than 4:1. The dilution water dispenser 36 can also release grit from the paste-type lime composition.

As illustrated in FIG. 1, the dilution chamber 34 can further include rotating rakes 38 and a dust shield 40. The rotating rakes 38 keep the slurry in suspension and help move the released grit through the dilution chamber 34. Further, the dust shield 40 collects dust and vapor generated by the exothermic reaction of the lime and water. Dust and vapor collected by the dust shield 40 can be drawn off by an integral dust arrestor 46. The drawn off vapor and dust can then be condensed with water and returned to the dilution chamber 34 or to a separate drain. Any excess vapor and dust can be vented out from the base slaker 14 through a vapor vent 47.

Figure 2:
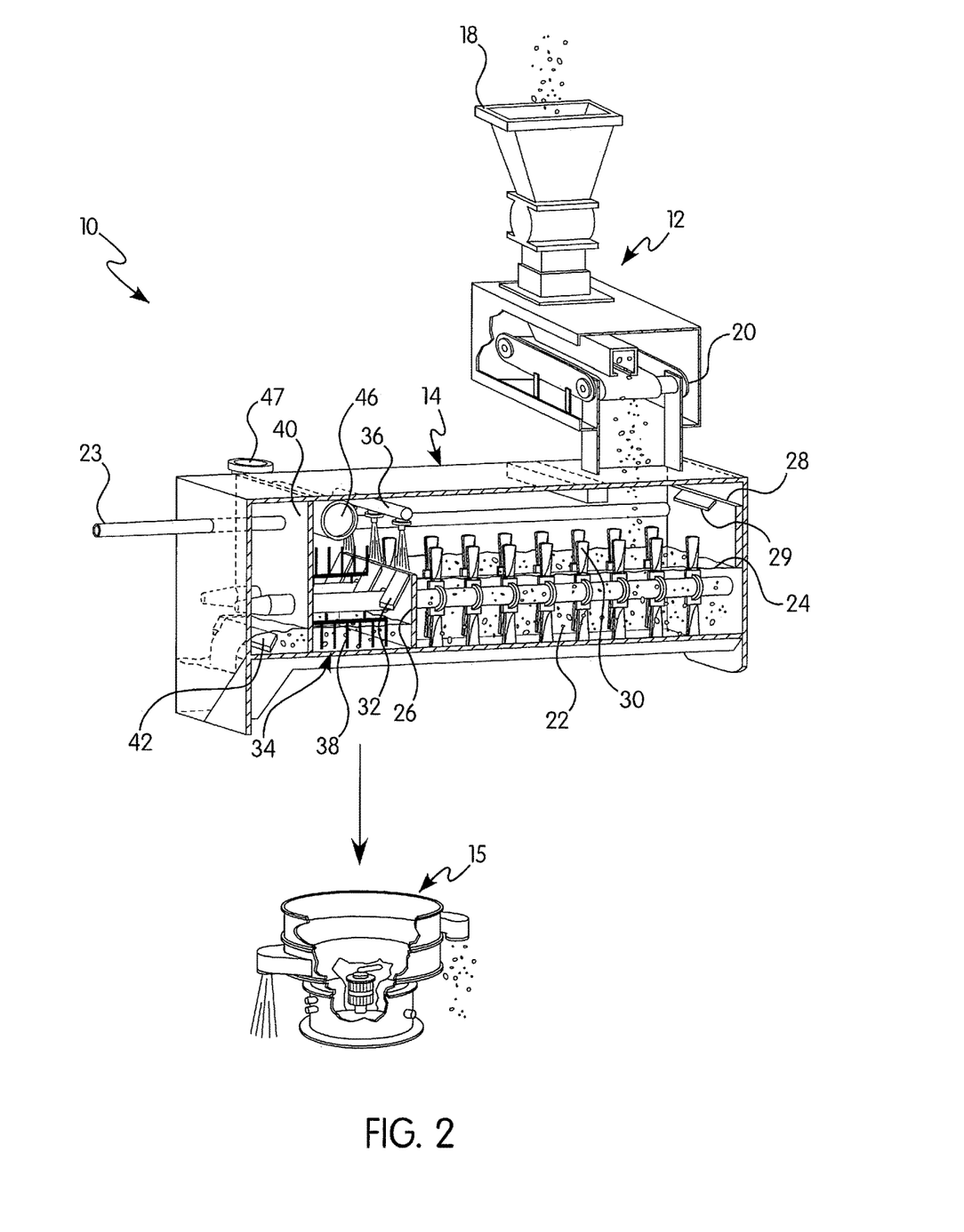
FIG. 2 is a perspective cross-sectional view of a lime feeder, base slaker, and grit remover of a lime slaker system according to another aspect of the present invention.
Figure 3:
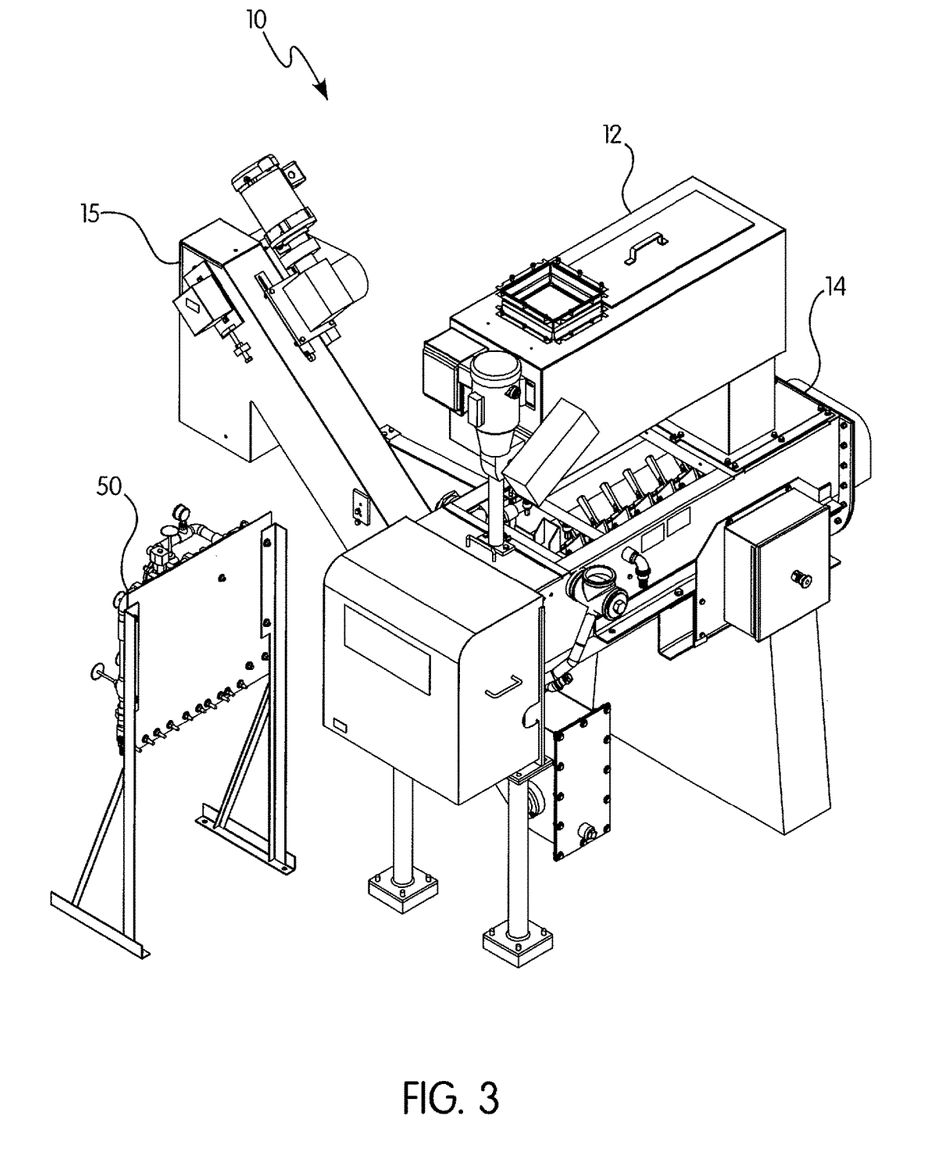
FIG. 3 is a perspective view of the lime slaker system of FIG. 1 that further includes a modular water panel according to the present invention.
Figure 4:
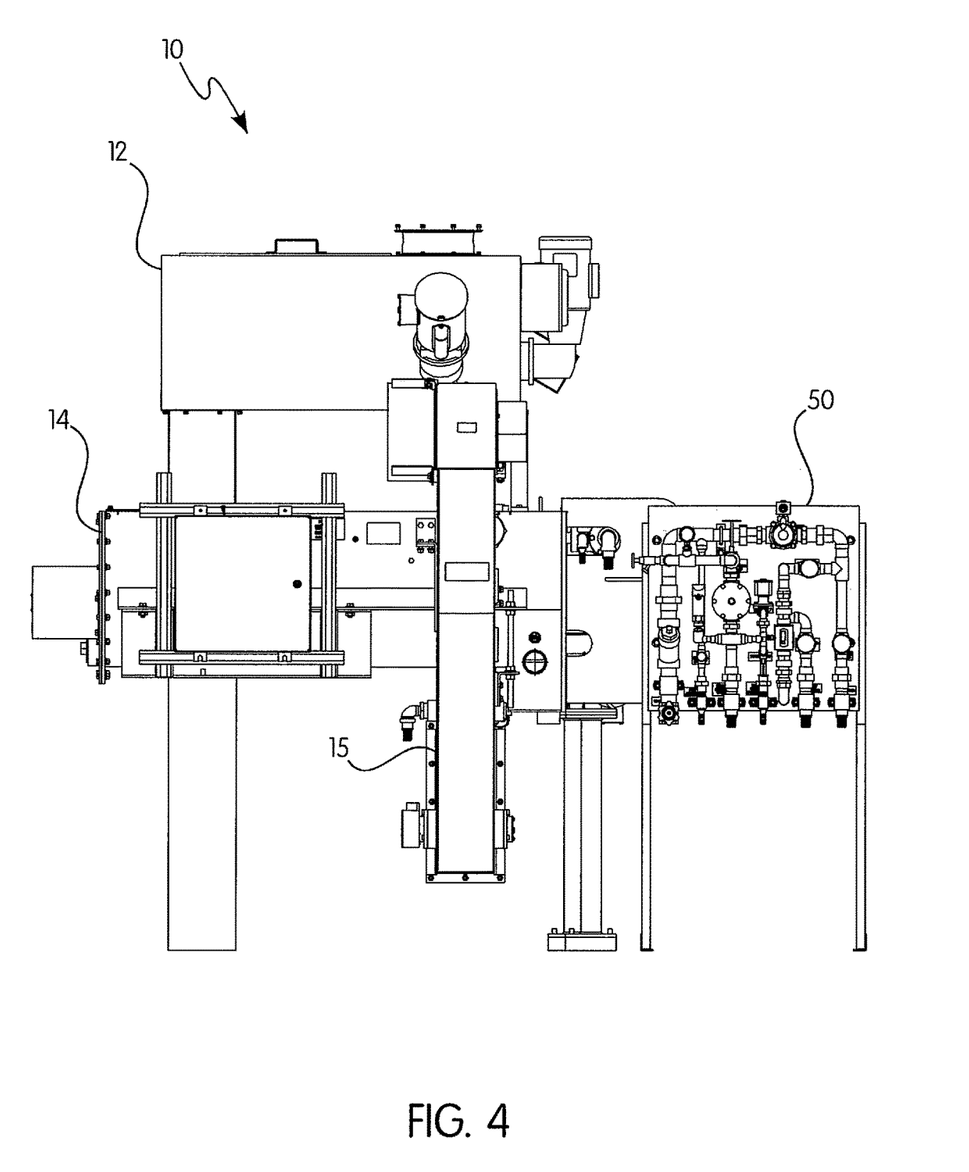
FIG. 4 is a first side view of the lime slaker system of FIG. 3.
Figure 5:
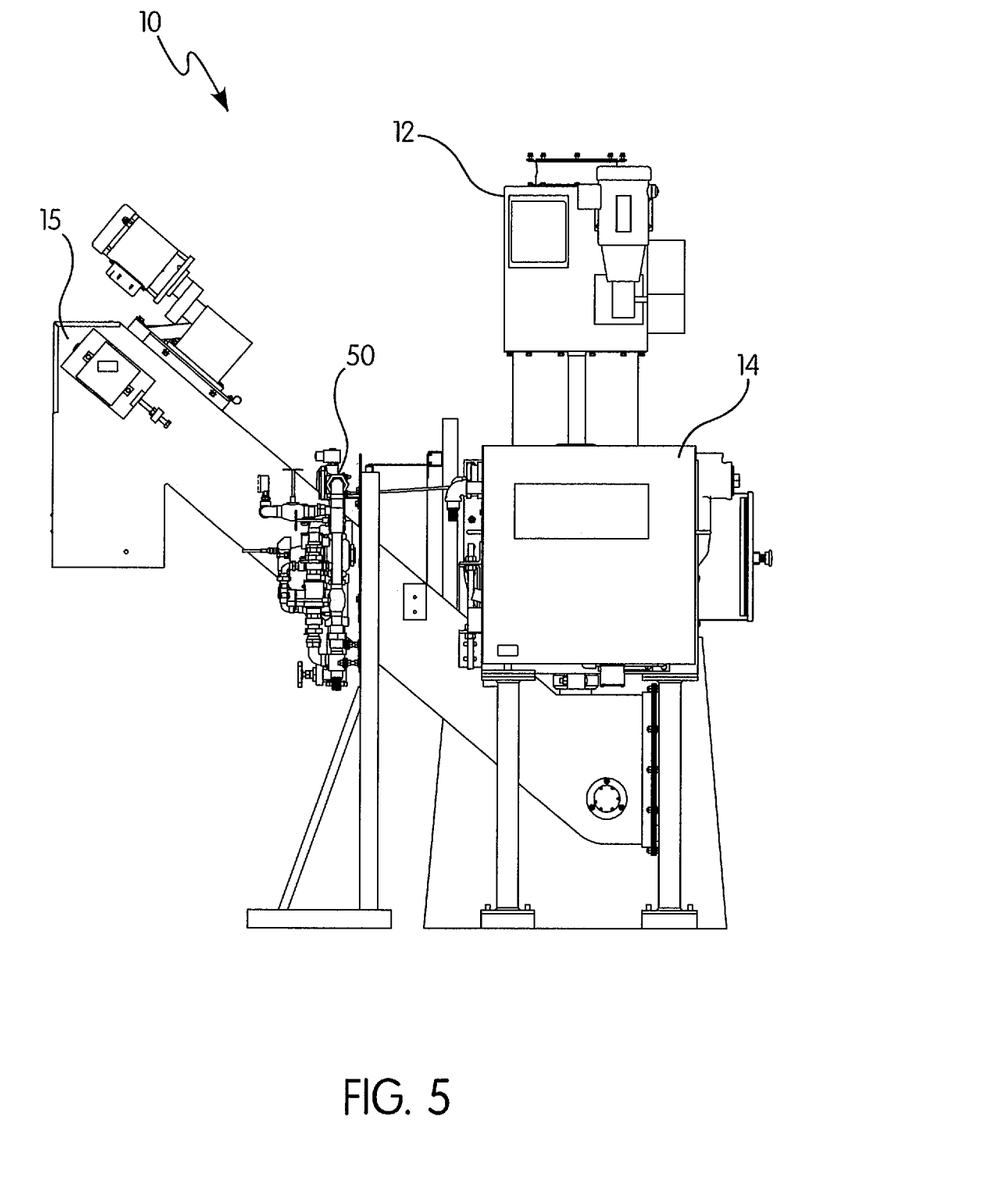
FIG. 5 is a second side view of the lime slaker system of FIG. 3.
Figure 6:
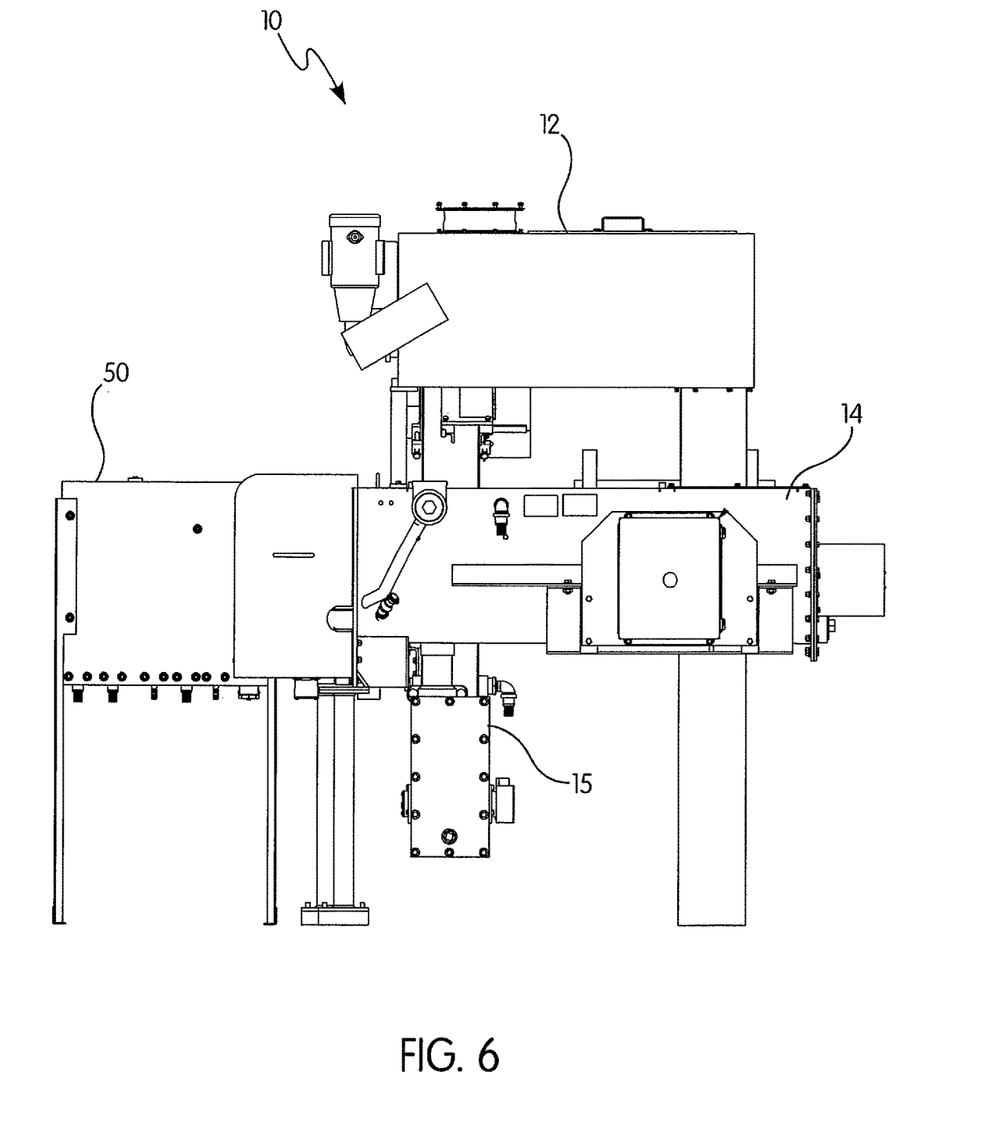
FIG. 6 is a front view of the lime slaker system of FIG. 3.

After the paste-type lime composition is diluted in the dilution chamber 34, the lime slurry can be discharged from the base slaker 14 to a grit remover 15. The slurry can be discharged directly from the dilution chamber 34 to a grit remover 15, where the slurry is separated from the grit. Alternatively, the lime slurry can pass under the dust shield 40 and to a second weir 42 that leads to a discharge port. The lime slurry will flow over another weir 42 and out the discharge port to a grit remover 15. The grit remover 15 used to separate the grit from the slurry can include, but is not limited to, a screen type grit remover 15, where the slurry is separated from the grit with a mesh screen as shown in FIG. 2 or a conveyor-type grit remover 15 that utilizes a separating device, such as a classifier as shown in FIG. 1. Fresh water is typically supplied to the grit remover 15 to help separate grit from the slurry.

The lime slaker system 10 can also have various interlocks and alarms to ensure proper operation and warning of a malfunction. The interlocks will stop the lime feeder 12 if the grit remover 15 or mixing device 30 stops, or if the water slaking pressure drops below the minimum operating requirement. When the operating pressure is restored, the feeder 12 is automatically restarted. In addition, when the paddle shafts stop, a bypass component, as described in further detail below, will flood the slaking compartment 22 with water.

Figure 7:
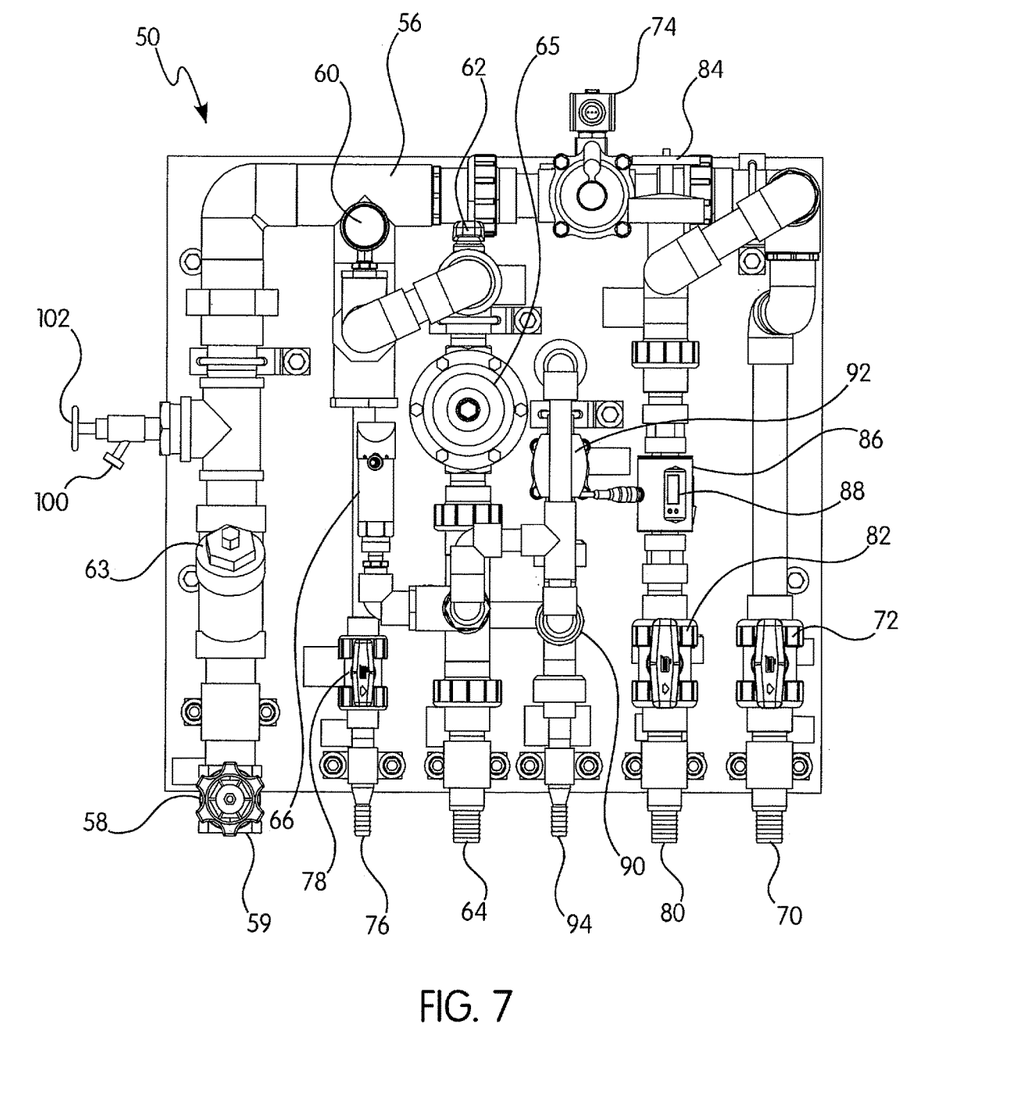
FIG. 7 is an enlarged front view of a modular water panel for a lime slaker system according to one aspect of the present invention.
Figure 8:
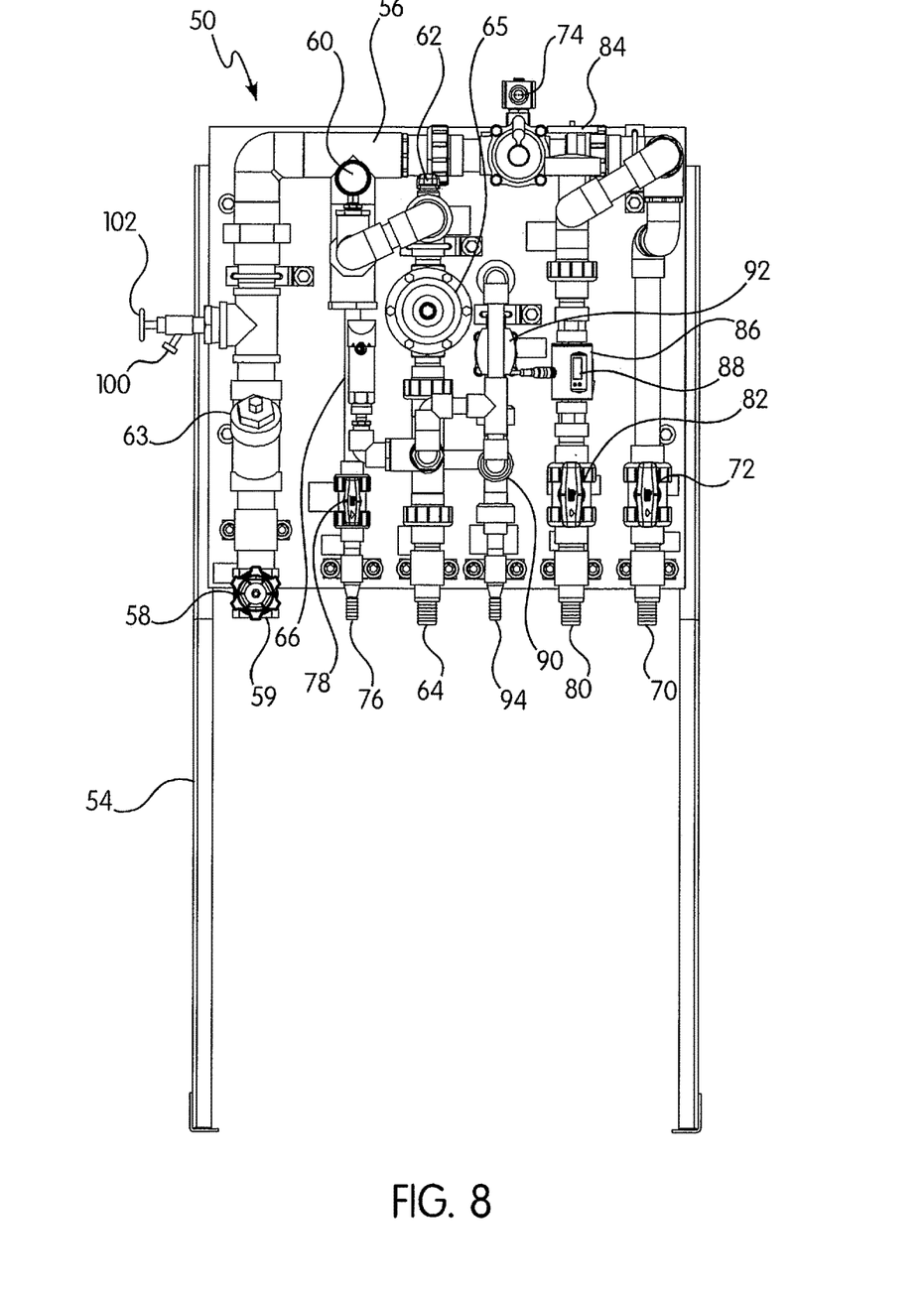
FIG. 8 is a front view of the modular water panel of FIG. 7 that further includes legs according to the present invention.

As indicated, water is supplied to the base slaker 14, grit remover 15, dust arrestor 46, and various other components of the lime slaker system 10 during operation. The water supplied to the various components of the lime slaker system 10 can be controlled and monitored with a modular water panel 50. FIGS. 3-6 illustrate a lime slaker system 10 that includes a modular water panel 50, and FIGS. 7-8 are an enlarged view of the modular panel 50. As shown in FIG. 8, the modular water panel 50 can include legs 54. Alternatively, the modular water panel 50 can be remotely mounted in any desired position.

Referring to FIG. 7, the modular water panel 50 can include a piping assembly 56 that is in fluid communication with the lime slaker system 10 to supply water to the various components of the lime slaker system 10. The modular water panel 50 can also include various controls to regulate and monitor the supply of water to the other components of the lime slaker system 10. For instance, and as shown in FIG. 7, the modular water panel 50 can include a supply water on/off valve 58 positioned near the water inlet 59 end of the piping assembly 56. The supply water on/off valve 58 is configured to control the water entering the piping assembly 56. As such, the supply water on/off valve 58 is used to control the water supply for the entire lime slaker system 10 and can be used to completely shut down the system 10. To monitor the incoming water pressure, a supply water pressure gauge 60 can be used with the piping assembly 56. If the supply water pressure gauge 60 displays an abnormal increase or decrease in water pressure, the water pressure can be adjusted accordingly. An abnormal increase or decrease in water pressure can also indicate a maintenance issue that can be resolved before a process stopping problem occurs.

Water entering the piping assembly 56 through the water inlet 59 typically contains debris and other contaminants. To remove these contaminants from the incoming water, one or more water strainers 63 can be positioned in at least a portion of the piping assembly 56. The water strainers 63 can be "Y" shaped segments of the piping assembly 56 that include mesh screens for trapping the incoming contaminants.

With continued reference to FIG. 7, the modular water panel 50 can further include a slaking water outlet 64 on the piping assembly 56 and a slaking water on/off valve 62. The slaking water on/off valve 62 is configured to control the supply of water distributed to the slaking compartment 22. For example, the slaking water on/off valve 62 can control the amount of water distributed out from the slaking water outlet 64 to the unit mounted slaking water valve 23. As previously described, the unit mounted slaking water valve 23 can be used to maintain a desired water-to-lime ratio. Further, to regulate the water pressure, the modular water panel 50 can include a slaking water pressure regulator 65. The slaking water pressure regulator 65 can regulate the water pressure based on a desired water pressure set-point. This prevents the unit mounted slaking water valve 23 from over-pressurizing. In addition, a slaking water pressure gauge and switch 66 can be used to identify the water pressure of the water distributed to the unit mounted slaking water valve 23. The switch portion sends a signal when the water pressure is too low. For easy evaluation, a display can be used with the slaking water pressure gauge and switch 66.

As previously described, the lime slaker system 10 can include a dilution water dispenser 36, such as a spray bar with nozzles, for breaking up and diluting the paste-type lime composition to form a lime slurry. As shown in FIG. 7, the modular water panel 50 can include a dilution water dispenser outlet 70 and a dilution water dispenser on/off valve 72. The dilution water dispenser on/off valve 72 is configured to control the supply of water distributed to the dilution water dispenser 36 for dilution of the paste-type lime composition. An auto-batching solenoid valve 74 can also be used to control the supply of water to at least the dilution water dispenser 36 during a shutdown process.

The modular water panel 50 can further include a dust arrestor water outlet 76 and a dust arrestor water on/off valve 78. The dust arrestor water on/off valve 78 is configured to control the supply of water distributed to the dust arrestor 46 positioned in the dilution chamber 34. The water distributed to the dust arrestor 46 ensures proper ventilation by condensing a majority of the dust and vapor formed during the slaking process. As previously noted, the condensed dust and vapor can be distributed back into the dilution chamber 34.

Referring to FIG. 7, the modular water panel 50 can also include a grit remover water outlet 80 and a grit remover water on/off valve 82. The grit remover water on/off valve 82 is configured to control the supply of water distributed to the grit remover 15. A grit remover water flow control valve 84 can also be used to regulate the water flow to the grit remover 15 during operation. The grit remover water flow control valve 84 can be used to adjust the water flow so that grit is removed from the lime slurry throughout the entire slaking process. Further, the modular water panel 50 can include an electronic flowmeter 86 that measures the water flowing into the grit remover 15. A display 88 can be positioned on the modular water panel 50 to evaluate the water flow measured by the electronic flowmeter 86. Together, the grit remover water flow control valve 84 and the electronic flowmeter 86 can be used to optimize water flow so that grit is effectively removed from the lime slurry. In addition, the auto-batching solenoid valve 74 previously described can also be used to control the supply of water to the grit remover 15 during a shutdown process.

Moreover, the modular water panel 50 can also include controls for bypassing the unit mounted slaking water valve 23 during a start-up and/or shutdown sequence. For example, the modular water panel 50 can have a bypass water manual control valve 90, a bypass water solenoid valve 92, and bypass water outlet 94 that can be used to bypass the unit mounted slaking water valve 23 to supply water to the slaking compartment 22 during a start-up and/or shutdown sequence. The bypass water manual control valve 90, bypass water solenoid valve 92, and bypass water outlet 94 can also supply water to the slaking compartment 22 in the event of a power failure to prevent the lime from hardening.

The modular water panel 50 is not limited to the previously described components and can include additional components. For instance, the modular water panel 50 can also include a hose outlet 100 and hose wash down valve 102. The hose wash down valve 102 can control the distribution of water to a hose connected to the hose outlet 100. The hose outlet 100 and hose wash down valve 102 allow for an easy and convenient cleaning process.

Figure 9:
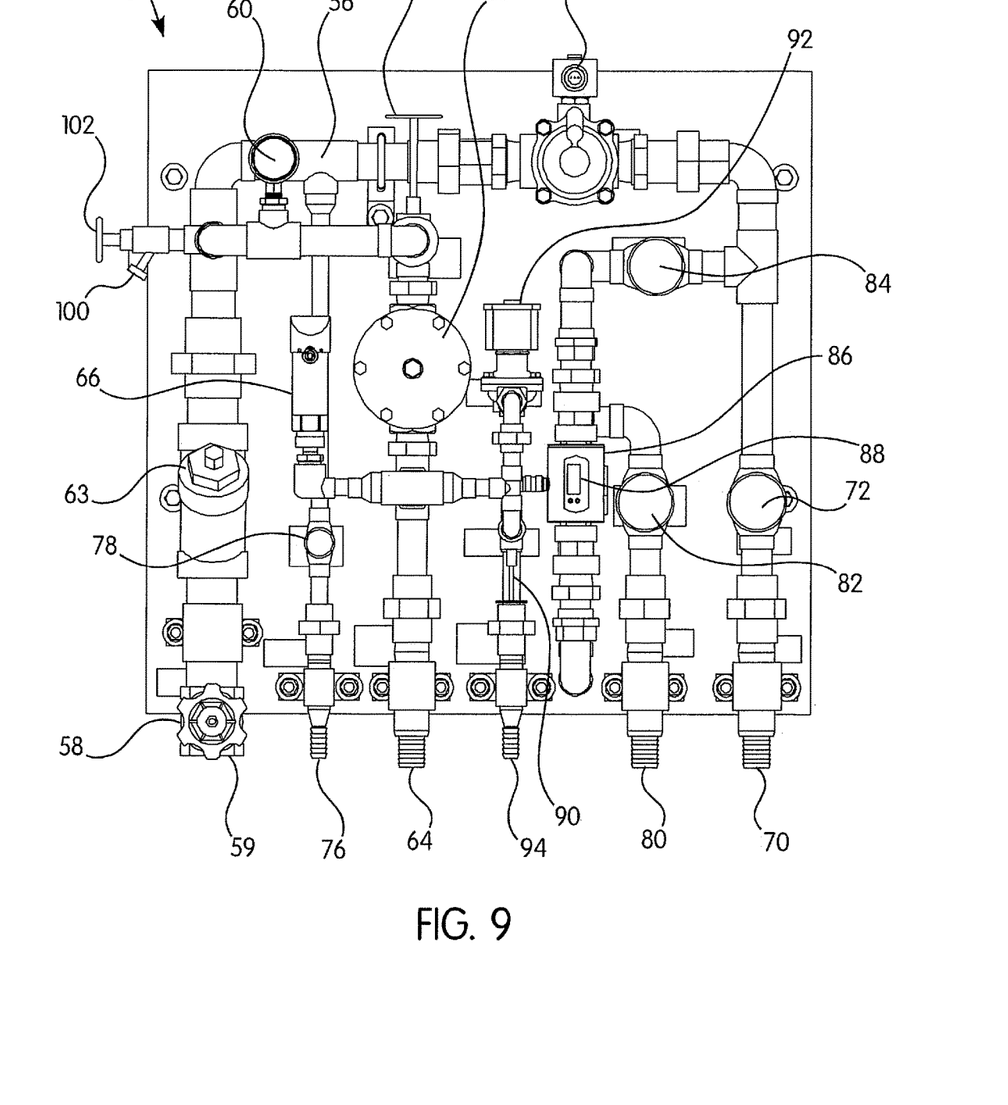
FIG. 9 is an enlarged front view of a modular water panel for a lime slaker system according to another aspect of the present invention.

It is appreciated that the previously described components that make up the modular water panel 50 can be arranged in various positions and orientations and is not limited to the arrangement shown in FIGS. 7 and 8. For example, FIG. 9 shows a modular water panel 50 with the previously-described components arranged in a different orientation as compared to FIGS. 7 and 8.

Figure 10:
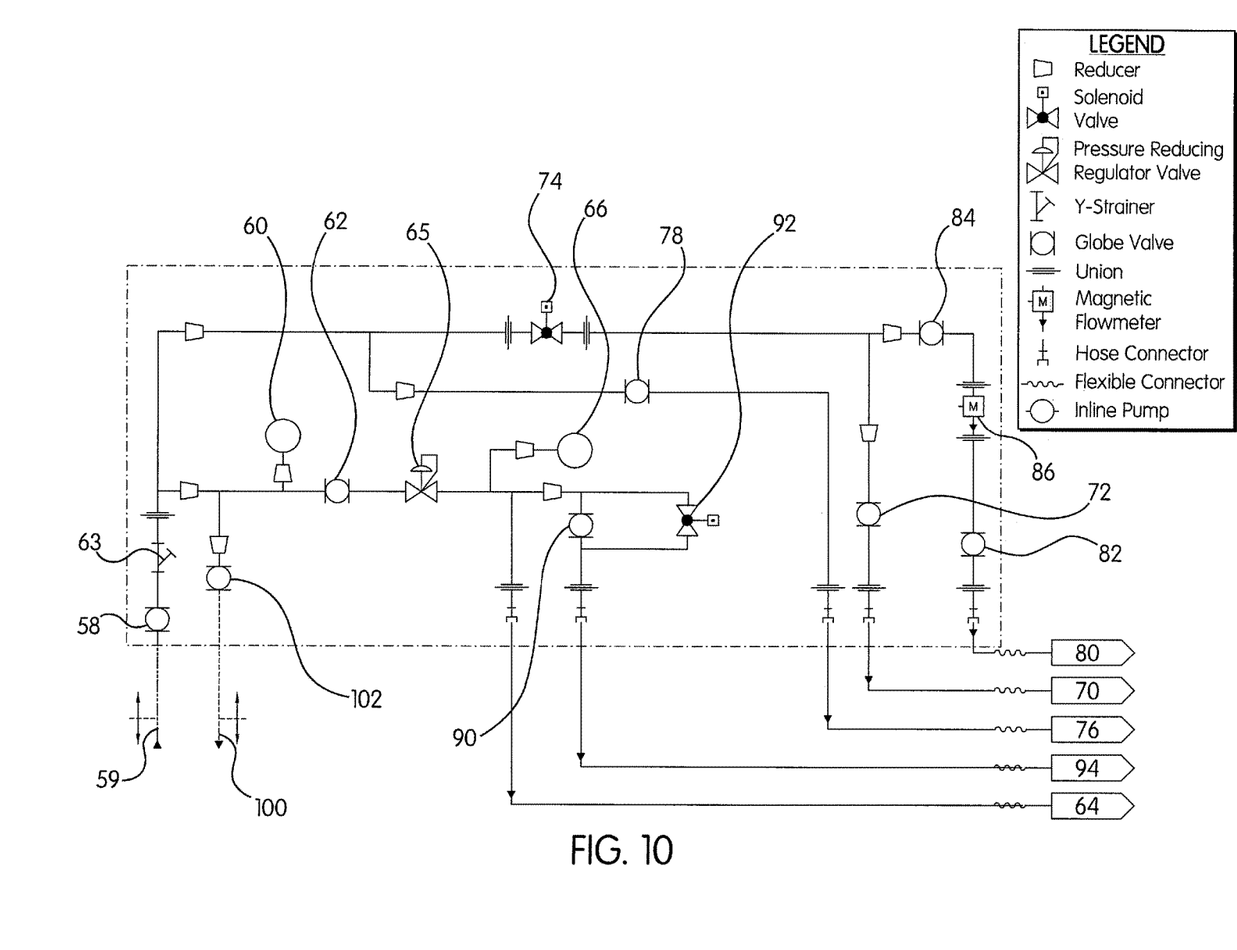
FIG. 10 is a water flow schematic through the modular water panel shown in FIGS. 7 and 8.

Further, the flow of water through the previously-described components of the modular water panel 50 is illustrated in FIG. 10. As shown in FIG. 10, various types of valves, connectors, and the like can be used to control the flow of water through each component of the modular water panel 50. However, it is appreciated that different types of valves, connectors, and devices other than those shown in FIG. 10 can be used to control the flow of water through each component of the modular water panel 50.

The modular water panel 50 previously described can provide various benefits. Particularly, the modular water panel 50 can provide: mobile; remote and/or local mounting; fast and efficient installation; ease of connections being present in one area; repeatability and consistency; manufacturing labor savings; more machine access; localized control; ease for replacement; ease for maintenance; standardization of product lines; and decrease in machine damage. While the modular water panel 50 is described in relation to a particular lime slaker system 10, it is appreciated that the modular water panel 50 can be used with other lime slaker systems to provide any of the previously described benefits.

In one preferred and non-limiting embodiment or aspect, the present invention is also directed to a method of slaking lime. The method can include feeding quicklime into the slaking compartment 22 with the lime feeder 12, distributing water into the slaking compartment 22, mixing the lime and water in the slaking compartment 22 to form a paste-type lime composition, and diluting the paste-type composition with water in a dilution chamber 34 to form a slurry. As previously mentioned, lime and water can be fed into the slaking chamber 22 at any desired ratio such as a water-to-lime ratio of 2:1 for example, and then diluted to a different water-to-lime ratio concentration, such as a water-to-lime ratio of 4:1 for example.

The method of slaking lime can also include collecting dust and vapor in a dust arrestor 46, and condensing the dust and vapor with water. The condensed dust and vapor can then be distributed back into the dilution chamber 34. The method can further include a step of removing grit from the lime slurry with water and a grit remover 15. Moreover, when a shut-down sequence and/or start-up sequence is initiated, or during a power failure, the method can further include supplying water to the slaking compartment 22 that bypasses the unit mounted slaking water valve 23.

The water distributed to the slaking compartment 22, dilution chamber 34, dust arrestor 46, and grit remover 15 can be supplied, controlled, and/or monitored throughout the method by the modular water control panel 50. Any of the previously described components of the modular water control panel 50 can be used for supplying, controlling, and/or monitoring water to the lime slaker system 10 throughout the slaking process. It is appreciated that the method of slaking lime can include additional steps using the previously described lime slaker system 10.

Figure 11:
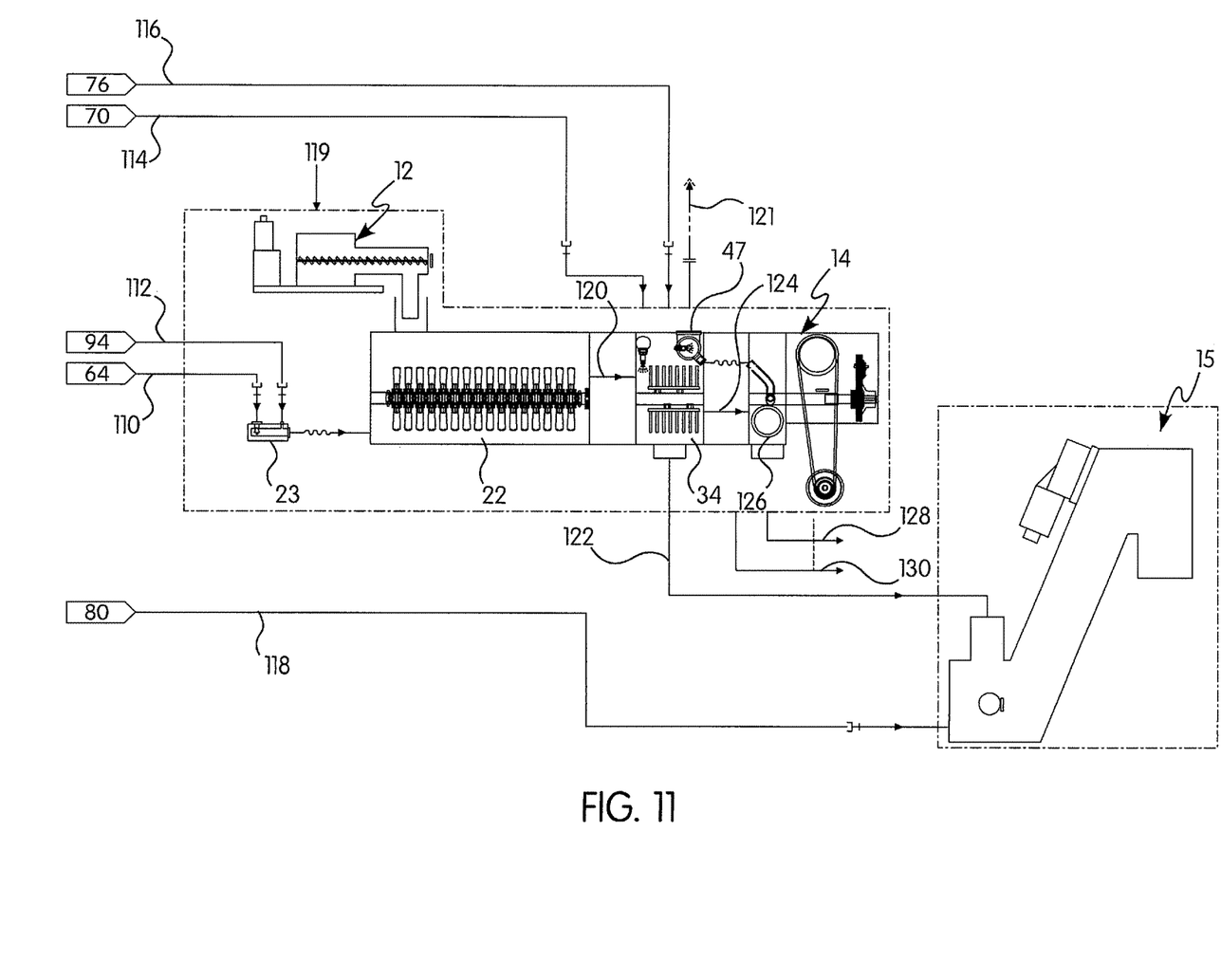
FIG. 11 is a schematic illustrating the flow of water from a modular water panel to a lime slaker system and the production of a lime slurry according to the present invention.

The flow of water from the modular water panel 50 to the base slaker 14/grit remover 15 and the production of a lime slurry according to one example of the present invention is illustrated in FIG. 11. Referring to FIG. 11, the modular water panel 50 can be used to control the flow of water that enters a slaking water line 110, a bypass water line 112, a dilution water dispenser line 114, a dust arrestor water line 116, and a grit remover water line 118. During operation of the lime slaker system 10, quicklime 119 from the lime feeder 12 and water from the slaking water line 110 are fed into the slaking compartment 22 for form a lime paste. The lime paste is then transferred into the dilution chamber 34 as shown by transfer line 120. Next, water is delivered to the dilution chamber 34 through the dilution water dispenser line 114 in order to dilute the lime paste and form a lime slurry. Water can also be delivered through the dust arrestor water line 116 to condense vapor and dust formed during the slaking process. Excess vapor and dust can be released through vent 47 as shown by exit line 121.

After forming the lime slurry, the slurry grit can be discharged directly from the dilution chamber 34 to the grit remover 15 through grit transfer line 122. Alternatively, the grit can be transferred to an exit chamber 126, as illustrated by slurry transfer line 124, where it is then transferred to the grit remover 15. The grit separated slurry then exits the lime slaker system 10 through application line 128.

As further shown in FIG. 11, water can also be fed into the slaker compartment 22 through bypass water line 112 during a start-up sequence, during a shut-down sequence, or in the event of a power failure to prevent the lime in the slaker compartment 22 from hardening. The water can then exit the base slaker 14 through an overflow connection 130.

The lime slaking process of the present invention can also be operated automatically controlled with a controller such as, for example, a programmable logic controller, a microprocessor, a central processing unit, and/or any other like device capable of processing data, such as a computing device having programmable instructions or software thereon, which, when executed by a processor of the computing device, causes the processor to implement or facilitate any of the described steps.

Further, the lime slaking process of the present invention can be used in a continuous process where the slaking operations remain constant. In a continuous lime slaking process, lime slurry is discharged while the lime feed rate can be varied to account for flow or process variations. The continuous process can include a gravity flow directly to the point of application without the need for costly slurry handling.

Alternatively, the lime slaking process of the present invention can be used in a batch process where the lime slaker system 10 can be automatically stopped and started from a single contact closure. The low water-to-lime ratios ensure a fast start up to bring the slaker online quickly.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A lime slaker system, comprising:
   (a) a lime feeder;
   (b) a base slaker comprising a slaking compartment and a dilution chamber;
   (c) a dilution water dispenser positioned in the dilution chamber;
   (d) a grit remover; and
   (e) a modular water panel comprising a piping assembly in fluid communication with at least the base slaker and grit remover and at least one of (i) a dilution water dispenser on/off valve configured to control flow of water to the dilution water dispenser and (ii) an auto-batching solenoid valve configured to control flow of water to at least one of the grit remover and the dilution water dispenser during a shut-down sequence,
   wherein the modular water panel is configured to independently control water distributed to the slaking compartment, the dilution chamber, and the grit remover.

2. The lime slaker system of claim 1, further comprising a dust arrestor positioned in the dilution chamber.

3. The lime slaker system of claim 2, wherein the modular water panel further comprises a dust arrestor water on/off valve configured to control flow of water to the dust arrestor.

4. The lime slaker system of claim 1, wherein the modular water panel further comprises a supply water on/off valve configured to control water entering the piping assembly.

5. The lime slaker system of claim 1, wherein the modular water panel further comprises a slaking water on/off valve configured to control flow of water to the slaking compartment.

6. The lime slaker system of claim 1, wherein the modular water panel further comprises a grit remover water on/off valve configured to control flow of water to the grit remover.

7. The lime slaker system of claim 1, wherein the modular water panel further comprises a bypass water manual valve.

8. The lime slaker system of claim 1, wherein the modular water panel further comprises a hose wash-down valve.

9. The lime slaker system of claim 1, wherein the modular water panel further comprises a water strainer positioned in at least a portion of the piping assembly.

10. A lime slaker system, comprising:
(a) a lime feeder;
(b) a base slaker comprising a slaking compartment and a dilution chamber;
(c) a dilution water dispenser positioned in the dilution chamber;
(d) a grit remover; and
(e) a modular water panel comprising: a piping assembly in fluid communication with at least the base slaker and grit remover; and at least one of (i) a hose wash-down valve and (ii) a water strainer positioned in at least a portion of the piping assembly,
wherein the modular water panel is configured to independently control water distributed to the slaking compartment, the dilution chamber, and the grit remover.

11. The lime slaker system of claim 10, further comprising a dust arrestor positioned in the dilution chamber.

12. The lime slaker system of claim 11, wherein the modular water panel further comprises a dust arrestor water on/off valve configured to control flow of water to the dust arrestor.

13. The lime slaker system of claim 10, wherein the modular water panel further comprises a supply water on/off valve configured to control water entering the piping assembly.

14. The lime slaker system of claim 10, wherein the modular water panel further comprises a slaking water on/off valve configured to control flow of water to the slaking compartment.

15. The lime slaker system of claim 10, wherein the modular water panel further comprises a grit remover water on/off valve configured to control flow of water to the grit remover.

16. The lime slaker system of claim 10, wherein the modular water panel further comprises a bypass water manual valve.

17. A modular water control panel in fluid communication with a lime slaker device configured to convert quicklime into a lime slurry, the modular water control panel comprising a piping assembly and controls configured to control flow of water to the lime slaker device, and a dilution water dispenser on/off valve, a hose wash-down valve, and an auto-batching solenoid valve.

18. The modular water control panel of claim 17, further comprising a supply water on/off valve.

19. The modular water control panel of claim 17, further comprising a slaking water on/off valve.

20. The modular water control panel of claim 17, further comprising a dust arrestor water on/off valve.

* * * * *

UNITED STATES PATENT AND TRADEMARK OFFICE
CERTIFICATE OF CORRECTION

PATENT NO. : 10,494,297 B2
APPLICATION NO. : 15/888372
DATED : December 3, 2019
INVENTOR(S) : Roop C. Jain et al.

Page 1 of 1

It is certified that error appears in the above-identified patent and that said Letters Patent is hereby corrected as shown below:

In the Specification

Column 1, Line 10, delete "Feb. 2, 2016," and insert -- Feb. 9, 2016, --

Signed and Sealed this
Seventeenth Day of March, 2020

Andrei Iancu
*Director of the United States Patent and Trademark Office*